United States Patent
Ur et al.

(10) Patent No.: US 9,408,243 B2
(45) Date of Patent: Aug. 2, 2016

(54) LINE OF SIGHT INITIATED HANDSHAKE

(71) Applicant: EMPIRE TECHNOLOGY DEVELOPMENT LLC, Wilmington, DE (US)

(72) Inventors: Shmuel Ur, Galil (IL); Vlad Grigore Dabija, Mountain View, CA (US); David Ash, Bellevue, WA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 14/408,135

(22) PCT Filed: May 13, 2013

(86) PCT No.: PCT/US2013/040710
§ 371 (c)(1),
(2) Date: Dec. 15, 2014

(87) PCT Pub. No.: WO2014/185885
PCT Pub. Date: Nov. 20, 2014

(65) Prior Publication Data
US 2015/0181632 A1   Jun. 25, 2015

(51) Int. Cl.
*H04W 76/02* (2009.01)
*H04W 12/08* (2009.01)
*H04W 4/00* (2009.01)

(52) U.S. Cl.
CPC ............ *H04W 76/023* (2013.01); *H04W 4/008* (2013.01); *H04W 12/08* (2013.01)

(58) Field of Classification Search
CPC .................................................. H04W 76/023
USPC ........................................ 455/39, 41.1–41.3
See application file for complete search history.

(56) References Cited

U.S. PATENT DOCUMENTS 7,748,621 B2 * 7/2010 Gusler et al. ................. 235/383
2011/0213664 A1 * 9/2011 Osterhout et al. ......... 705/14.58

(Continued)

FOREIGN PATENT DOCUMENTS

| CN | 103064188 A | 4/2013 |
| WO | 2009109068 A1 | 9/2009 |
| WO | 2013066334 A1 | 5/2013 |

OTHER PUBLICATIONS

"Augmented Reality and Pupil Tracking go Hand-in-Hand to Merge the Virtual and Real World," Eye Tracking Update, accessed at: http://web.archive.org/web/20130621131927/http://eyetrackingupdate.com/2009/11/16/augmented-reality-and-pupil-tracking-go-hand-in-hand-to-merge-the-virtual-and-real-world/, Nov. 16, 2009, pp. 1-3.

(Continued)

*Primary Examiner* — Tuan H Nguyen
(74) *Attorney, Agent, or Firm* — Moritt Hock & Hamroff LLP; Steven S. Rubin, Esq.

(57) ABSTRACT

Technologies are generally described for systems, devices and methods effective to implement a line of sight initiated handshake. In some examples, a processor in a first communication device may detect a line of sight directed from the first communication device to a second communication device. The first communication device may send a handshake request to the second communication device. The first communication device may receive a handshake acknowledgement from the second communication device. The handshake request and handshake acknowledgement may be effective to create the handshake. The first and second communication devices can thereafter share data.

20 Claims, 6 Drawing Sheets

(56) References Cited

U.S. PATENT DOCUMENTS

2013/0113827 A1 5/2013 Forutanpour et al.
2013/0137076 A1 5/2013 Perez et al.

OTHER PUBLICATIONS

"Eye Tracking and Augmented Reality: The Future of Advertising," Eye Tracking Update, accessed at: http://web.archive.org/web/20130621073848/http://eyetrackingupdate.com/2010/10/05/eye-tracking-augmented-reality-future-advertising/, Oct. 5, 2010, pp. 1-3.

"Gaze-enhanced User Interface Design," accessed at: http://web.archive.org/web/20130510135907/http://hci.stanford.edu/research/GUIDe/, accessed on Sep. 16, 2014, pp. 1-3.

International Search Report and Written Opinion for International Application No. PCT/US2013/040710, mailed on Aug. 25, 2014, 16 pages.

Jabarin, B. et al., "Establishing Remote Conversations Through Eye Contact With Physical Awareness Proxies," Extended Abstracts on Human Factors in Computing Systems, 2003, pp. 948-949.

* cited by examiner

LINE OF SIGHT INITIATED HANDSHAKE

CROSS REFERENCE TO RELATED APPLICATIONS

This application is a National Stage filing under 35 U.S.C. §371 of International Application No. PCT/US13/40710 filed on May 13, 2013, the entirety of which is hereby incorporated by reference.

BACKGROUND

Unless otherwise indicated herein, the materials described in this section are not prior art to the claims in this application and are not admitted to be prior art by inclusion in this section.

Augmented reality may use the real world as a background and add a layer of augmented information. A sensor may capture real image information. A processor may change the captured real information by adding additional information about the real world image. For example, an image of a real building may be displayed as an image of a Victorian era building.

SUMMARY

In an example, methods for initiating a handshake between a first communication device and a second communication device are generally described. The methods may include detecting, by a processor in the first communication device, a line of sight directed from the first communication device to the second communication device. The methods may include sending a handshake request from the first communication device to the second communication device. The methods may further include receiving, at the first communication device, a handshake acknowledgement from the second communication device, the handshake request and the handshake acknowledgement may be effective to create the handshake.

In an example, a first communication device effective to initiate a handshake between the first communication device and a second communication device is generally described. The first communication device may include a memory and a processor configured to be in communication with the memory. The processor may be configured to detect a line of sight directed from the first communication device to the second communication device. The processor may be configured to send a handshake request from the first communication device to the second communication device. The processor may be configured to receive a handshake acknowledgement from the second communication device. The handshake request and handshake acknowledgement are effective to create the handshake In an example, a system is generally described. The system may include a first communication device, a network, and a second communication device configured to be in communication with the first communication device over the network. The first communication device may include a first memory and a first processor configured to be in communication with the first memory. The first processor may be configured to detect a line of sight directed from the first communication device to the second communication device. The first processor may be configured to send a handshake request from the first communication device to the second communication device. The second communication device may include a second memory and a second processor configured in communication with the second memory. The second processor may be effective to receive the handshake request and generate a handshake acknowledgement in response. The first processor may be effective to receive the handshake acknowledgement from the second communication device. The handshake request and the handshake acknowledgement may be effective to create the handshake.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
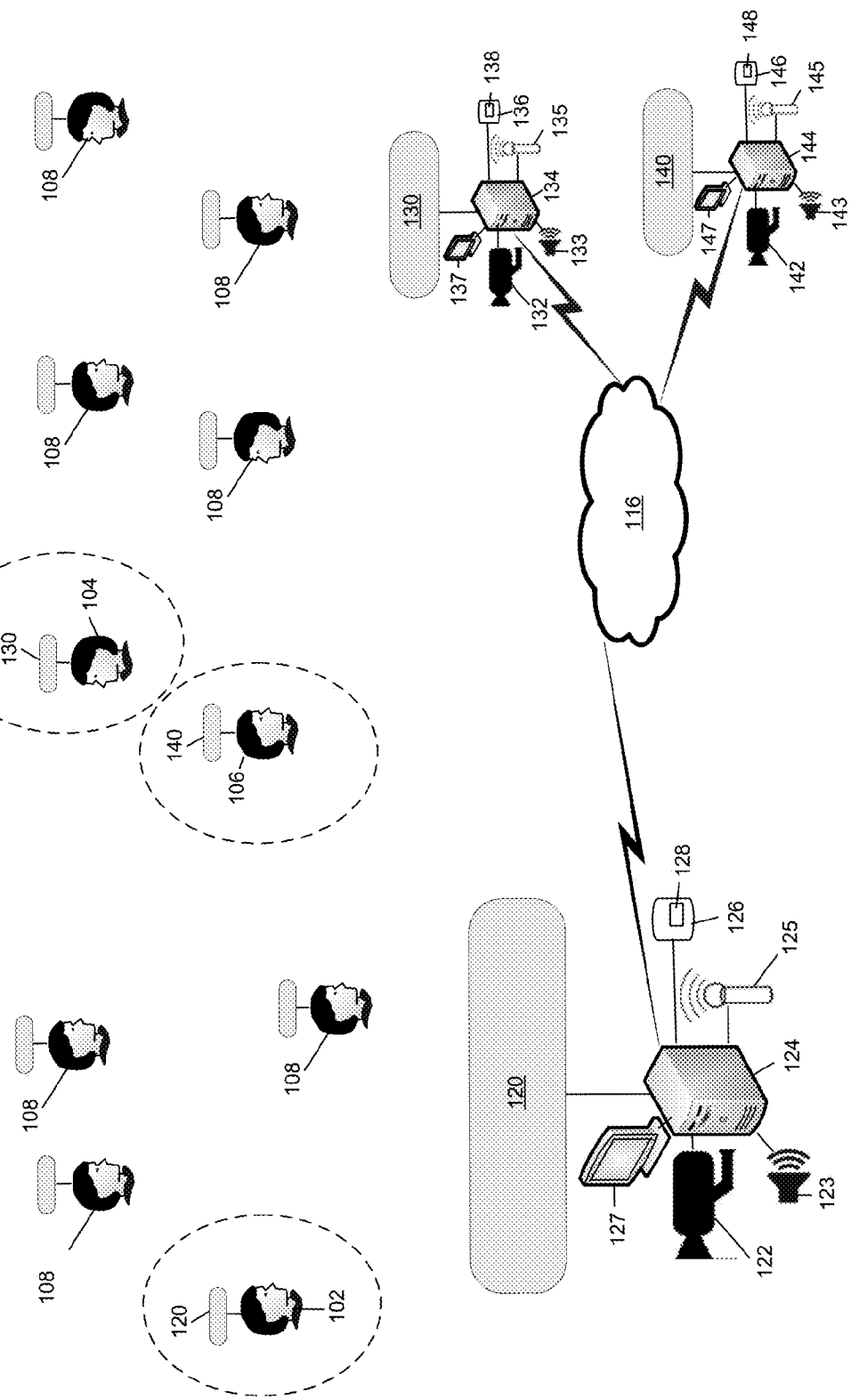
FIG. 1 illustrates an example system effective to implement a line of sight initiated handshake.

all arranged in accordance with at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to implementation of a line of sight initiated handshake.

Briefly stated, technologies are generally described for systems, devices and methods effective to implement a line of sight initiated handshake. A processor in a first communication device may detect a line of sight directed from the first communication device to a second communication device. The first communication device may send a handshake request to the second communication device. The first communication device may receive a handshake acknowledgement from the second communication device. The handshake request and handshake acknowledgement may be effective to create the handshake. The first and second communication devices can thereafter share data.

As described in more detail below, in an example, first and second users using first and second communication devices, respectively, may direct respective lines of sight to maintain eye contact for a threshold amount of time. The first communication device may receive an input from the first user that the first user wants to share data with the second user. In response to the input requesting to share data, the first communication device may send a handshake request to the second communication device. The second communication device can receive the handshake request and create the handshake by sending an acknowledgement to the first communication device. When the handshake is created, the two communication devices may then share data. The shared data may be, for example, audio information, images, videos, etc.

In another embodiment, a first user using/wearing a first communication device may direct a line of sight at a second user using/wearing a second communication device. In this example, the first user may not be able to establish eye contact with the second user. The first user, through the first communication device, may request to share data with the second user. In response to the request to share data, the first communication device may send a handshake request to the second communication device. The second communication device may receive the handshake request, may inform the second user that a handshake is requested and may display or identify the first user to the second user. The second communication device can create the handshake if the second communication device sends an acknowledgement to the first communication device. When the handshake is created, the two communication devices may then share data.

FIG. 1 illustrates an example system that can be utilized to implement a line of sight initiated handshake, arranged in accordance with at least some embodiments described herein. As discussed in more detail below, in some examples, a system 100 may include two or more communication devices 120, 130, and/or 140 that may be used by two or more users 102, 104, and/or 106. In some examples, communication devices 120, 130, 140 may be augmented reality ("AR") devices (herein sometimes referred to as a "device", "AR device", or "communication device") such as augmented reality glasses like GOGGLE GLASS. Devices 120, 130 and/or 140 may be in communication over a network 116. In some examples, network 116 may be, or include, a local area network and/or a wide area network, a Wi-Fi network and/or a BLUETOOTH network, etc.

AR device 120 may include a camera 122, a speaker 123, a processor 124, a microphone 125, a memory 126, and/or a display 127. Memory 126 may include instructions 128. AR device 130 may include a camera 132, a speaker 133, a processor 134, a microphone 135, a memory 136, and/or a display 137. Memory 136 may include instructions 138. AR device 140 may include a camera 142, a speaker 143, a processor 144, a microphone 145, a memory 146, and/or a display 147. Memory 146 may include instructions 148.

As discussed in more detail below, user 102 may use communication device 120 to initiate a handshake request with user 104 from among other users 108. For example, communication device 120 may detect a line of sight of user 102 directed toward second user 104. A line of sight may include, for example, a cone or paraboloid with one end at a user's iris and an another end extending from the iris. The line of sight may be unobstructed or partially obstructed. Second user 104 may use communication device 130 to send an acknowledgement in response to the handshake request. For example, communication device 130 may detect a line of sight of user 104 directed toward user 102 and send the acknowledgement in response to detection of the line of sight of user 104. In other examples discussed herein, user 102 may also use communication device 120 to initiate a handshake request with user 106 even when a line of sight of user 106 is not directed toward user 102.

Figure 2:
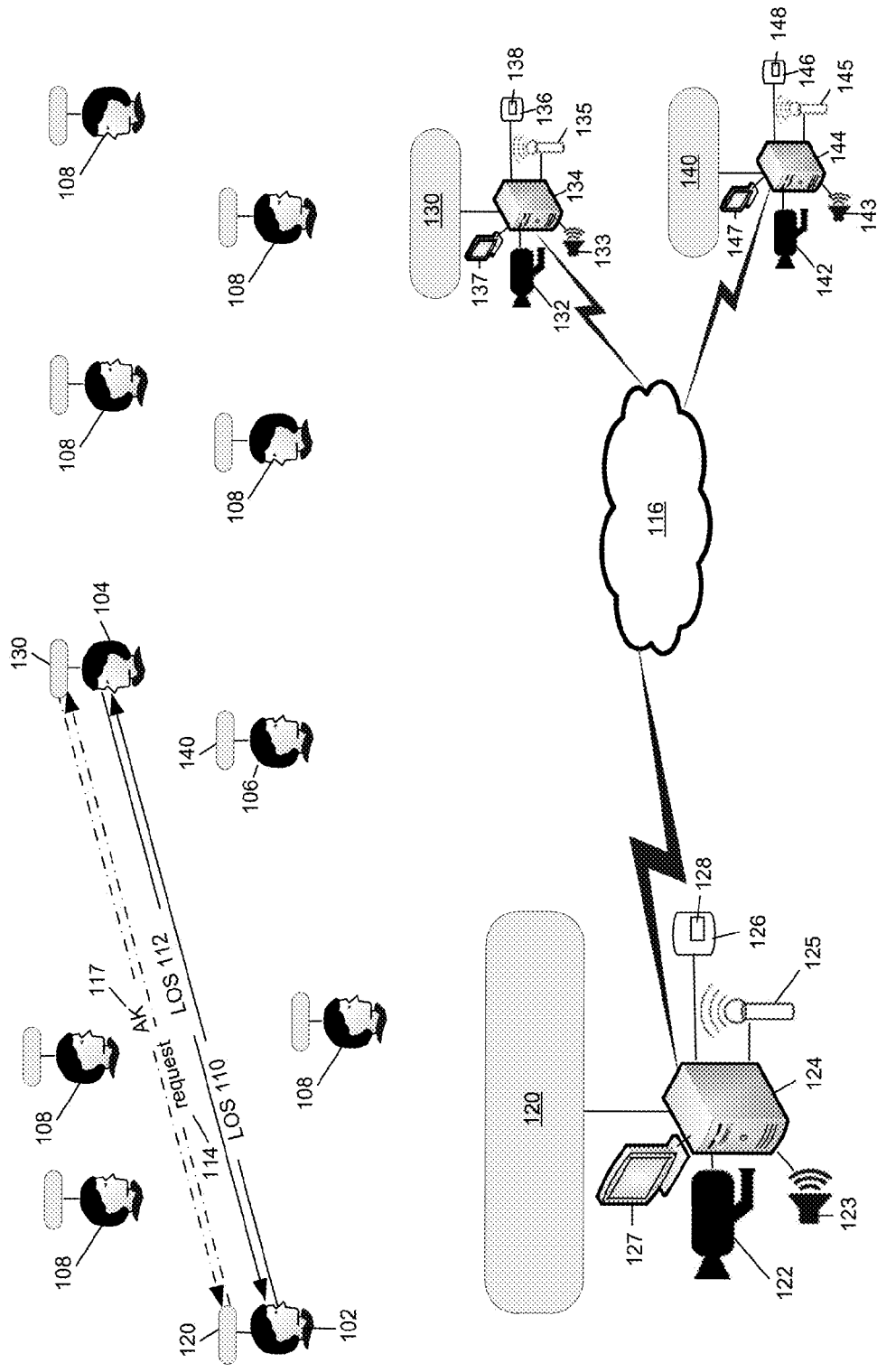
FIG. 2 illustrates an example system effective to implement a line of sight initiated handshake.

FIG. 2 illustrates an example system 150 that can be utilized to implement a line of sight initiated handshake, arranged in accordance with at least some embodiments described herein. FIG. 2 is substantially similar to system 100, with additional details. Those components in FIG. 2 that are labeled identically to components of FIG. 1 will not be described again for the purposes of clarity.

In an example, users 102, 104, 106 may be at a location, such as in a room, with other users 108. AR device 120 may detect that user 102 wearing/using AR device 120 has directed a line of sight ("LOS") 110 toward user 104. For example, eye tracking software may be stored in memory 126 and used by processor 124 to detect line of sight 110. Eye tracking software may, for example, look for corneal reflection and the center of the pupil for a feature used to determine eye direction. Eye tracking software may also look at head position and head direction. Eye tracking software may combine head position, head direction, and eye direction to detect line of sight 110.

User 104 may notice user 102 directing line of sight 110 toward user 104. In response to noticing line of sight 110, user 104 may then direct his/her line of sight 112 toward user 102. AR device 130 may detect that user 104 has chosen to direct a line of sight (LOS) 112 toward user 102. Users 102 and 104 may then establish eye contact by directing lines of sight 110, 112 so that lines of sight 110, 112 coincide for a certain threshold amount of time. In an example, the threshold amount of time may be between about 1 and about 3 seconds. Eye tracking software 128 in memory 126 may detect line of sight 110 of user 102. Eye tracking software 128 may further detect line of sight 112 of user 104, because, in part, an image of user 104 appears in a field of view of camera 122 of communication device 120. After lines of sight 110, 112 are detected, AR device 120 may further detect that lines of sight 110 and 112 coincide for the threshold amount of time. Eye tracking software 128 may detect that lines of sight 110 and 112 coincide when the eyes of user 102 are detected as being directed towards the eyes of user 104 and the eyes of use 104 are detected as being directed towards the eyes of user 102.

Users 102 and 104 may maintain eye contact for the threshold amount of time, as may be detected by eye tracking software 128 detecting that lines of sight 110, 112 coincide. AR device 120 may identify AR device 130 and send a request ("request") 114 for a handshake to AR device 130. For example, user 102 may instruct AR device 120 to send request 114. In another example, request 114 may be sent in response to AR device 120 detecting that lines of sight 110, 112 have coincided for the threshold amount of time. Request 114 may be directed to AR device 130 such as by a directional antenna or through directed optical communication. Request 114 may also be broadcast to some or all devices in a communication range and request 114 may include identification data about the device the request is intended for. Identification data may include a location of device 130, an identification of user 104 such as a picture, information about user 104, etc. AR device 130 may be identified due to AR device 130 appearing in a field of view of AR device 120. AR device 130 may be identified due to AR device 130 being located along line of sight 112 from user 102. In examples where multiple communication devices are in the field of view of AR device 120 and/or along line of sight 112, request 114 may be sent or broadcast to two or more communication devices.

In an example, AR device 120 may, upon detection of a verbal cue, a gesture, a head movement, touching a button or a surface of AR device 120, etc., send request 114 for a handshake to AR device 130. Request 114 may include information about device 120 such as a picture of user 102, audio recorded by microphone 125, a location of user 102, a name of user 102, etc. AR device 130 may inform user 104 of request 114 such as through display 137 or speaker 133. AR device 130 may further display an image of, or otherwise identify, user 102 to user 104. For example, AR device 130 may output some of the information relating to communication device 120 in request 114 such as through display 137 or speaker 133. User 104 may instruct AR device 130 to create the handshake by sending an acknowledgement ("AK") 117 to user 102. AR device 130 may detect an instruction by user 104 to send acknowledgement 117 such as by detecting a verbal cue, a gesture, a head movement, touching a button or a surface of device 130, etc.

Acknowledgement 117 may include information related to communication device 130, including information related to user 104, such as a picture of user 106, audio recorded by microphone 135, a location of user 106, a name of user 106, etc. Communication device 120 may validate acknowledgement 117, such as by analyzing information in acknowledgement 117. In an example, acknowledgement 117 may include a picture of user 104. Communication device 120 may display the picture of user 104 on display 127. Communication device 120 may request that user 102 confirm that the picture corresponds to the person with whom user 102 would like to communicate. User 102 may provide an input to communication device 120 to validate acknowledgement 117. If acknowledgement 117 is validated, a handshake is created between AR device 120 and AR device 130.

When the handshake is created between AR device 120 and AR device 130, the two AR devices may then share data. Sharing of data may include sending and receiving audio or video data. Sharing of data may include utilizing respective speakers 123 and 133, microphones 125 and 135, cameras 122 and 132, and/or displays 127 and 137. For example, users 102 and 104 may communication with one another, even in a noisy room, because of the handshake and subsequent data sharing created by request 114 and acknowledgement 117.

In an example, first user 102 may direct his/her line of sight toward second user 104. Second user 104 may similarly direct his/her line of sight toward the first user. The lines of sight may coincide indicating that the first and second users wish to communicate. First and second users may each be wearing augmented reality glasses such as GOGGLE GLASS. AR device 120 may detect the lines of sight and determine that AR device 130 is along line of sight 110. The first user may blink or touch a surface of communication device 120 indicating that user 102 wishes to share data with user 104. The first communication device, in response to detecting the request by user 102 to initiate a handshake, may send a request for a handshake to the second communication device. The request may include a picture of the user. The picture may have been captured by camera 122.

The second communication device may receive the request. The second user may then indicate to the second communication device that the second user desires to talk with the first user such as by blinking or touching the second communication device. In response to the second user indicating a desire to talk, the second communication device may send a handshake acknowledgement to the first communication device. The first communication device may receive the acknowledgement and create the handshake. A communication path is now created between the first and second users. For example, the first user may talk into microphone 125. The first AR device may send information captured through the microphone to the second AR device. The second AR device may output the information through speaker 133.

Figure 3:
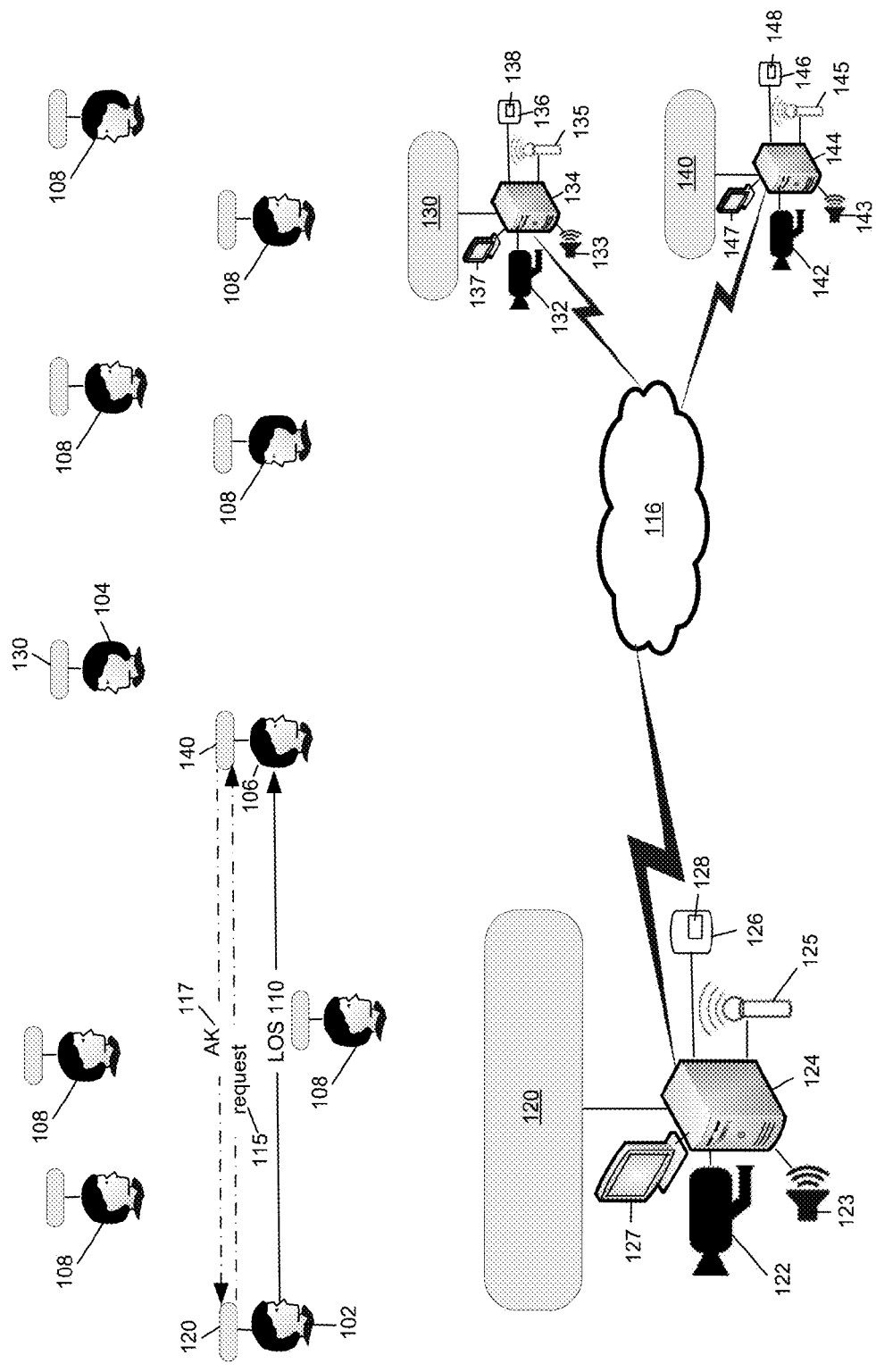
FIG. 3 illustrates an example system effective to implement a line of sight initiated handshake.

FIG. 3 illustrates an example system 200 effective to implement a line of sight initiated handshake, arranged in accordance with at least some embodiments described herein.

System 200 in FIG. 3 is substantially similar to systems 100 and 150, with additional details. Those components in FIG. 3 that are labeled identically to components of FIG. 1 and FIG. 2 will not be described again for the purposes of clarity.

In another example, AR device 120 may detect that user 102 using AR device 120 has directed his/here line of sight (LOS) 110 toward user 106. User 106 may not be directing his/her line of sight in the direction of user 102. User 102 may want to communicate with user 106 but not be able to establish eye contact. In the example, AR device 120 may detect an instruction from user 102 to send a request 115 for a handshake from AR device 120 to AR device 140. Request 114 may include information about communication device 120, such as a picture of user 102, audio recorded by microphone 125, a location of user 102, a name of user 102, etc. The instruction by user 102, detected by AR device 120, may be a verbal cue, a gesture, a head movement, touching a button or surface on device 120, etc. Request 115 may be broadcast by AR device 120 to devices within a broadcasting range of AR device 120. AR device 140 may receive request 115 and output portions of request, or information in request 115, to user 106 such as through display 147 or speaker 143.

AR device 140 may display or identify user 102 to user 106 such as by displaying an image on display 147 of device 140 and highlighting user 120 in the image. For example, AR device 140 may identify AR device 120 or user 102 based on information in handshake request 114 in examples when the information includes a location or other identification of AR device 120. After AR device 140 has identified AR device 120, AR device 140 may then identify user 102 and highlight user 102 on display 147.

User 106 may request that device 140 acknowledge request 114 and create the handshake. User 106 may instruct AR device 140 to create the handshake by sending a handshake acknowledgement ("AK") 117 to user 102. The handshake acknowledgement instruction by user 106, detected by AR device 140, may be a verbal cue, a gesture, a head movement, touching a button or surface on device 140, etc. Acknowledgement 117 may include information about device 140, such as a picture of user 106.

Communication device 120 may validate acknowledgement 117, such as by analyzing information in acknowledgement 117. In an example, acknowledgement 117 may include a picture of user 106. Communication device 120 may display the picture of user 106 on display 127. Communication device 120 may request that user 102 confirm that the picture corresponds to the person that user 102 would like to communicate with. User 102 may provide an input to communication device 120 to validate acknowledgement 117. If acknowledgement 117 is validated, a handshake is created between AR device 120 and AR device 140.

In an example, first user 102 may direct his/her line of sight toward second user 106. Second user 106 may be directing his/her line of sight away from the first user. First and second users may each be wearing augmented reality glasses such as GOGGLE GLASS. The first user may blink or touch a surface of communication device 120 indicating that user 102 wishes to share data with user 106. The first communication device, in response, may send a request for a handshake to the second communication device. The request may include a picture of the first user. The picture may have been captured by camera 122.

The second communication device may receive the request. The second communication device may display the picture of the first user on display 147. The second communication device may also highlight the first user on display 147. The second user may then indicate to the second communication device that the second user desires to talk with the first user such as by blinking or touching the second communication device. In response to the second user indicating a desire to talk to the first user, the second communication device may send a handshake acknowledgement to the first communication device. The first communication device may receive the acknowledgement and create the handshake. A communication path is now created between the first and second users. For example, the first user may talk into microphone 125. The first AR device may send information captured through the microphone to the second AR device. The second AR device may output the information through speaker 143.

Among other potential benefits, a system in accordance with the disclosure may be able to allow users to initiate communication with other users in a loud or crowded location. For example, a first user may be able to invite a second user to dance from across a room at a loud and crowded nightclub. In another example, a first user may be able to establish communication with a second user in a noisy, crowded room by looking at the second user, even if the second user is not looking in the direction of the first user.

Figure 4:
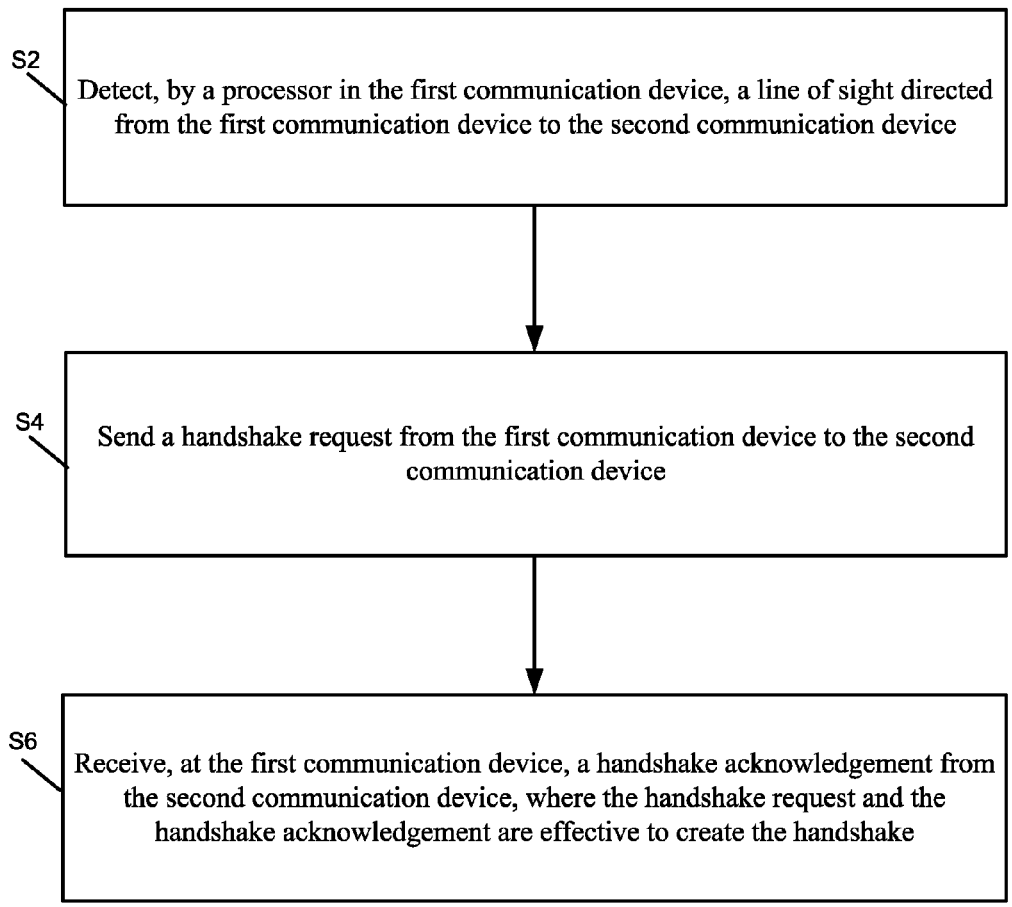
FIG. 4 depicts a flow diagram for example processes for implementing a line of sight initiated handshake.

FIG. 4 depicts a flow diagram for example processes 250 for implementing a line of sight initiated handshake, arranged in accordance with at least some embodiments described herein. The process in FIG. 4 could be implemented using, for example, systems 100, 150 or 200 discussed above. An example method for initiating a handshake between a first communication device and a second communication device may include one or more operations, actions, or functions as illustrated by one or more of blocks S2, S4, and/or S6. Although illustrated as discrete blocks, various blocks may be divided into additional blocks, combined into fewer blocks, or eliminated, depending on the desired implementation. Processing may begin at block S2.

At block S2, "Detect, by a processor in the first communication device, a line of sight directed from the first communication device to the second communication device". The processor in the first communication device may use eye tracking software stored in a memory to detect the line of sight. The processor may determine that the line of sight is directed towards a second communication device. The first and second communication devices may include augmented reality glasses.

Processing may continue from block S2 to block S4, "Send a handshake request from the first communication device to the second communication device". The handshake request may be sent in response to the processor detecting the line of sight of the first communication device coincided with the line of sight of the second communication device for a threshold amount of time. The handshake request may be sent in response to the processor detecting a verbal cue, a gesture, a head movement, or a touch of a button or surface on the first communication device. The handshake request may include information about the first communication device, such as an image of a face of user, a location of a user, a name of user, etc.

Processing may continue from block S4 to block S6, "Receive, at the first communication device, a handshake acknowledgement from the second communication device, where the handshake request and the handshake acknowledgement are effective to create the handshake." The handshake acknowledgement may include information about the second communication device such as a picture of user. The first communication device may validate the acknowledgement such as by analyzing information in the acknowledgement. If the acknowledgement is validated, a handshake may be created between the first communication device and the second communication device. Data may be then shared between the first communication device and the second communication device.

Figure 5:
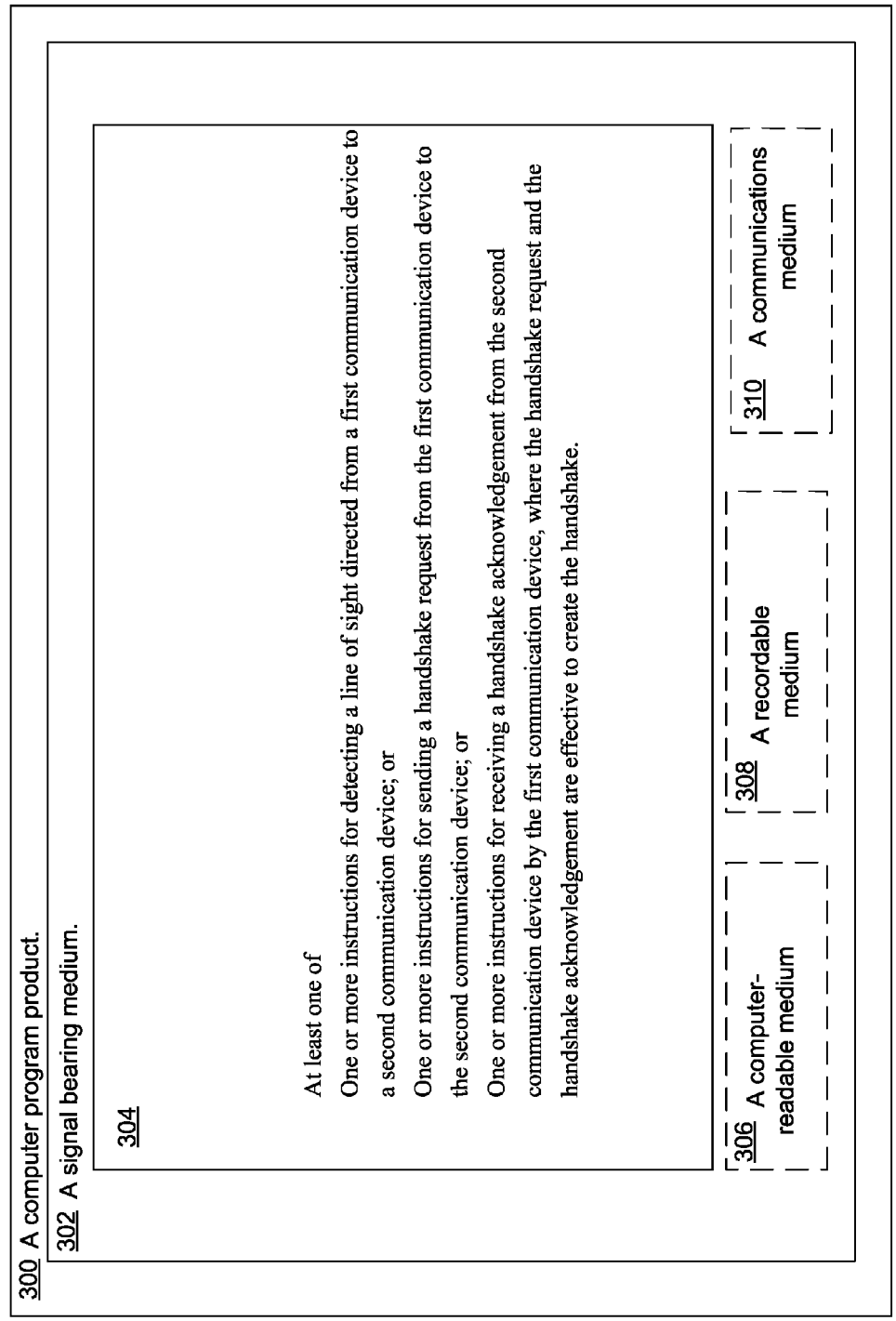
FIG. 5 illustrates a computer program product effective to implement a line of sight initiated handshake.

FIG. 5 illustrates a computer program product 300 effective to implement a line of sight initiated handshake, arranged in accordance with at least some embodiments described herein. Computer program product 300 may include a signal bearing medium 302. Signal bearing medium 302 may include one or more instructions 304 that, when executed by, for example, a processor, may provide the functionality described above with respect to FIGS. 1-4.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, computer program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

Figure 6:
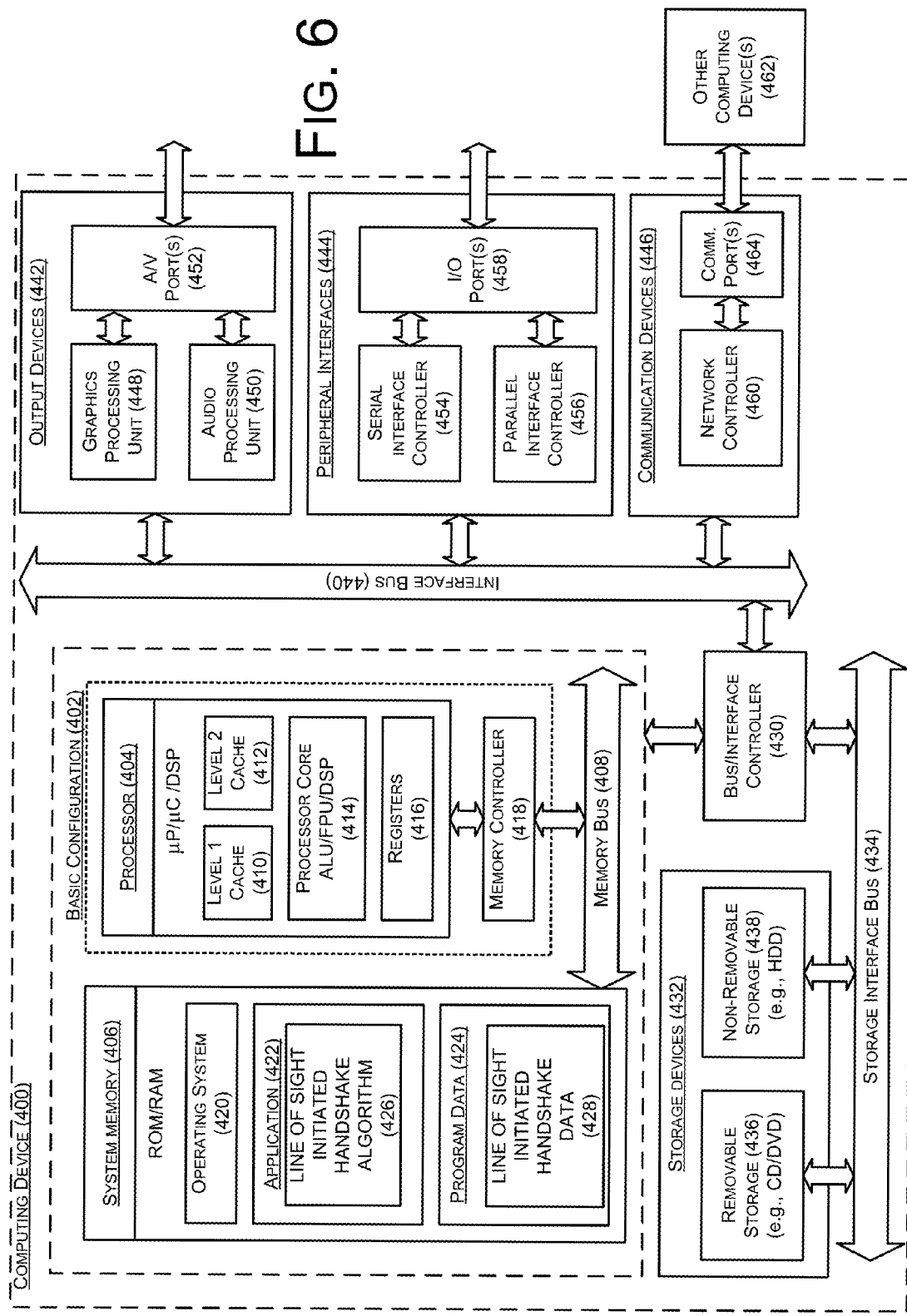
FIG. 6 is a block diagram illustrating an example computing device that is arranged to implement a line of sight initiated handshake.

FIG. 6 is a block diagram illustrating an example computing device 400 that is arranged to implement a line of sight initiated handshake, arranged in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424.

Application 422 may include a line of sight initiated handshake algorithm 426 that is arranged to perform the functions as described herein including those described previously with respect to FIGS. 1-5. Program data 424 may include line of sight initiated handshake data 428 that may be useful for implementing a line of sight initiated handshake as is described herein. In some embodiments, application 422 may be arranged to operate with program data 424 on operating system 420 such that implementing a line of sight initiated handshake may be provided. This described basic configuration 402 is illustrated in FIG. 6 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more AN ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to initiate a handshake between a first communication device and a second communication device, the method comprising: detecting, by a processor in the first communication device, a first line of sight directed from the first communication device to the second communication device; determining, by the processor in the first communication device, that the first line of sight of the first communication device and a second line of sight of the second communication device coincide for a threshold period of time; sending a handshake request from the first communication device to the second communication device, in response to the determination; and receiving, at the first communication device, a handshake acknowledgement from the second communication device, wherein the handshake request and the handshake acknowledgement are effective to create the handshake.

2. The method of claim 1, further comprising:
detecting a verbal cue, gesture, a touch of a surface of the first communication device, or a head movement; and
in response to detection of the verbal cue, gesture, touch of the surface of the first communication device, or head movement, sending the request to the second communication device.

3. The method of claim 1, wherein sending the handshake request includes sending information related to the first communication device.

4. The method of claim 1, wherein the first communication device comprises augmented reality glasses.

5. The method of claim 1, further comprising, detecting the first line of sight through use of eye tracking.

6. The method of claim 1, wherein the handshake acknowledgement includes information related to the second communication device; and
the method further includes validating, by the first communication device, the information related to the second communication device prior to creation of the handshake.

7. A first communication device effective to initiate a handshake between the first communication device and a second communication device, the first communication device comprising: a memory; a processor configured to be in communication with the memory, the processor configured to: detect a first line of sight directed from the first communication device to the second communication device; detect that the first line of sight of the first communication device and a second line of sight of the second communication device coincide for a threshold period of time; send a handshake request from the first communication device to the second communication device, in response to the determination; and receive a handshake acknowledgement from the second communication device, where the handshake request and handshake acknowledgement are effective to create the handshake.

8. The communication device of claim 7, wherein the processor is further configured to:
detect a verbal cue, gesture, a touch of a surface of the first communication device, or a head movement; and
in response to detection of the verbal cue, gesture, touch of the surface of the first communication device, or head movement, send the request to the second communication device.

9. The communication device of claim 7, wherein the handshake request includes information related to the first communication device.

10. The communication device of claim 7, wherein the first communication device is augmented reality glasses.

11. The communication device of claim 7, wherein the first communication device further includes a camera, a speaker, a microphone, and a display.

12. The communication device of claim 7, wherein the processor is further configured to detect the first line of sight through use of eye tracking.

13. The communication device of claim 7, wherein the handshake acknowledgement includes information related to the second communication device; and
the processor is further configured to validate the information related to the second communication device before creation of the handshake.

14. A system comprising: a first communication device; a network; a second communication device configured to be in communication with the first communication device over the network; the first communication device comprising: a first memory; a first processor configured to be in communication with the first memory, the first processor configured to: detect a first line of sight directed from the first communication device to the second communication device; determine that the first line of sight of the first communication device and a second line of sight of the second communication device coincide for a threshold period of time; and send a handshake request from the first communication device to the second communication device, in response to the determination; the second communication device including: a second memory; and a second processor configured in communication with the second memory, the second processor effective to receive the handshake request and generate a handshake acknowledgement in response; and wherein the first processor is effective to receive the handshake acknowledgement from the second communication device and wherein the handshake request and the handshake acknowledgement are effective to create the handshake.

15. The system of claim 14, wherein the handshake request includes information related to the first communication device.

16. The system of claim 14, wherein the first and second communication devices are augmented reality glasses.

17. The system of claim 14, wherein the first and second communication devices each include a respective camera, speaker, microphone and display.

18. The system of claim 14, wherein the first processor is further configured to detect the first line of sight through use of eye tracking software.

19. The system of claim 14, wherein the handshake acknowledgement includes information related to the second communication device; and the first processor is further configured to validate the information related to the second communication device before creation of the handshake.

20. The system of claim 14, wherein:

the handshake request includes information related to the first communication device;

the first and second communication devices each include a respective camera, speaker, microphone and display; and the second communication device is further effective to highlight the first communication device on the display of the second communication device based on the information related to the first communication device.

\* \* \* \* \*